United States Patent [19]
Bryant et al.

[11] Patent Number: 5,718,780
[45] Date of Patent: Feb. 17, 1998

[54] PROCESS AND APPARATUS TO ENHANCE THE PAINTBAKE RESPONSE AND AGING STABILITY OF ALUMINUM SHEET MATERIALS AND PRODUCT THEREFROM

[75] Inventors: J. Daniel Bryant, Midlothian, Va.; Hideo Yoshida; Hidetoshi Uchida, both of Nagoya, Japan

[73] Assignee: Reynolds Metals Company, Richmond, Va.

[21] Appl. No.: 573,895

[22] Filed: Dec. 18, 1995

[51] Int. Cl.$^6$ .................................................. C22C 21/00
[52] U.S. Cl. .......................... 148/688; 148/688; 148/552; 148/693; 148/537; 148/526
[58] Field of Search .................................. 148/552, 693, 148/537, 526

[56] References Cited

U.S. PATENT DOCUMENTS

| | | | |
|---|---|---|---|
| 3,135,633 | 6/1964 | Hornus | 148/159 |
| 3,947,297 | 3/1976 | Reimann et al. | 148/159 |
| 4,282,044 | 8/1981 | Robertson et al. | 148/2 |
| 4,323,399 | 4/1982 | Dubost et al. | 148/12.7 A |
| 4,614,552 | 9/1986 | Fortin et al. | 148/417 |
| 4,784,921 | 11/1988 | Hyland et al. | 428/654 |
| 4,790,884 | 12/1988 | Young et al. | 148/2 |
| 4,808,247 | 2/1989 | Komatsubara et al. | 148/2 |
| 4,812,178 | 3/1989 | Dubost | 148/12.7 |
| 4,838,958 | 6/1989 | Komatsubara et al. | 148/11.5 |
| 4,840,852 | 6/1989 | Hyland et al. | 428/654 |
| 4,897,124 | 1/1990 | Matsuo et al. | 148/2 |
| 4,909,861 | 3/1990 | Muraoka et al. | 148/12.7 A |
| 5,266,130 | 11/1993 | Uchida et al. | 148/552 |
| 5,306,362 | 4/1994 | Gupta et al. | 148/552 |
| 5,362,341 | 11/1994 | Palmer et al. | 148/692 |
| 5,441,582 | 8/1995 | Fujita et al. | 148/693 |

FOREIGN PATENT DOCUMENTS

| | | | |
|---|---|---|---|
| 62-142753 | 6/1987 | Japan | C22F 1/053 |
| 5-302154 | 11/1993 | Japan | C22F 1/05 |
| 6-65695 | 3/1994 | Japan | C22F 1/04 |

Primary Examiner—David A. Simmons
Assistant Examiner—M. Alexandra Elve
Attorney, Agent, or Firm—Alan M. Biddison

[57] ABSTRACT

A method and apparatus for making aluminum alloy sheet product with improved paintbake response during automotive paintbake cycles, resistance to natural aging and better formability includes rapidly heating the aluminum alloy sheet product between a solution heat treating/quenching operation and a sheet coiling operation. Performing the rapid heating at this stage in the sheet manufacture minimizes the adverse effect of early natural aging (dwell time) on the paintbake response of these types of aluminum sheet alloy products. According to the invention, this dwell time is minimized by the application of a rapid heating step immediately following quenching from the solution heat treatment. After the aluminum sheet product has been rapidly heated, it is immediately coiled and cools under ambient conditions in coil form, this ambient cooling providing a pre-aging treatment which contributes to the improved performance of the sheet product in paintbake response, improved formability and natural aging resistance.

24 Claims, 7 Drawing Sheets

Schematic of one conception of a semi-continuous pre-aging practice

Fig. 1: Schematic of pre-aging process for 6XXX alloys

Fig. 2: Effect of time delay between quenching and pre-aging for two AA 6111 alloys with and without leveling operations Fig. 3: Schematic of one conception of a semi-continuous pre-aging practice Fig. 4: Pre-aging cycles used to simulate natural cooling of 30,000 lb. coils of aluminum Fig. 5: Effect of pre-aging start temperature on yield strength Fig. 6: Effect of semi-continuous pre-aging at 3 starting temperatures on the T4 and post-paintbake yield strength Fig. 7: Effect of semi-continuous pre-aging with 3 start temperatures on total elongation and uniform elongation (engineering strain)

PROCESS AND APPARATUS TO ENHANCE THE PAINTBAKE RESPONSE AND AGING STABILITY OF ALUMINUM SHEET MATERIALS AND PRODUCT THEREFROM

FIELD OF THE INVENTION

The present invention is directed to a method and apparatus of making aluminum sheet product and products therefrom and, in particular, a method of pre-aging aluminum automotive sheet to produce a product which exhibits increased yield strength in response to automotive paintbake cycles, superior resistance to natural aging prior to stamping, and improved stamping performance.

BACKGROUND ART

In the automotive industry, the use of aluminum alloys is increasing due to the their desirable combination of properties, such as corrosion resistance, low density and compatibility with existing manufacturing methods and equipment.

Typically, vehicle sheet product is approximately 0.040" in thickness and includes both AA 2000 and AA 6000 series aluminum alloys. Preferred AA 2000 series alloys include AA 2008, AA 2010 and AA 2036. AA 6000 series alloys include AA 6010, AA 6016 and AA 6111. The AA 6000 series alloys are usually employed in automotive outer panel applications, such as deck lids or hoods, due to their higher strength and superior dent resistance.

One advantage certain aluminum alloys have for automotive applications is the ability to improve their properties using heat treatment. Ideally, these aluminum alloys have sufficient formability so that they can be formed or stamped into a desired panel or other component configuration and then subsequently strengthened during an automotive paintbaking cycle to improve dent resistance. Alternatively, a significant strengthening during the automotive paintbaking cycle could be exploited to allow for down gauging of the panel thickness, promoting even greater component weight savings. This strengthening is commonly referred to as the "paintbake response" (PBR).

The standard automotive paintbake cycle of about 350° F. for approximately 30 minutes is generally insufficient to impart a significant aging response (PBR) in AA 6XXX alloys. While a full T6 aging treatment of 8 hours at 350° F. can increase the yield strength of these alloys by up to 25 ksi, the standard 30 minute aging cycle generally imparts only a 2 to 4 ksi increase in yield strength.

To obtain improved PBR, the application of a pre-aging treatment to AA 6XXX alloys to enhance artificial aging and minimize natural aging has been proposed. A general schematic of a prior art pre-aging process for AA 6XXX alloys is given in FIG. 1. The application of a pre-age treatment generally enhances the kinetics of precipitation and decreases the precipitate size and lessens the average interparticle separation. The principle metallurgical effect in these types of pre-aging treatments is the refinement of the strengthening precipitates. It is this latter effect which is mainly responsible for the increased strength in pre-aged materials.

The pre-aging of AA 6111 alloys offers the potential of increasing the paintbake response substantially. As stated above, improved PBR would significantly improve the dent resistance (or allow down gauging), while maintaining the same formability. Other strategies to achieve these improvements may involve using leaner alloy compositions which could deliver low yield strength (lower springback) and superior formability in the T4 condition, and yet have dent resistance comparable to more heavily alloyed Al-Mg-Si-Cu alloys (such as AA 6111 and AA 6010) in the paintbaked condition.

Figure 1:
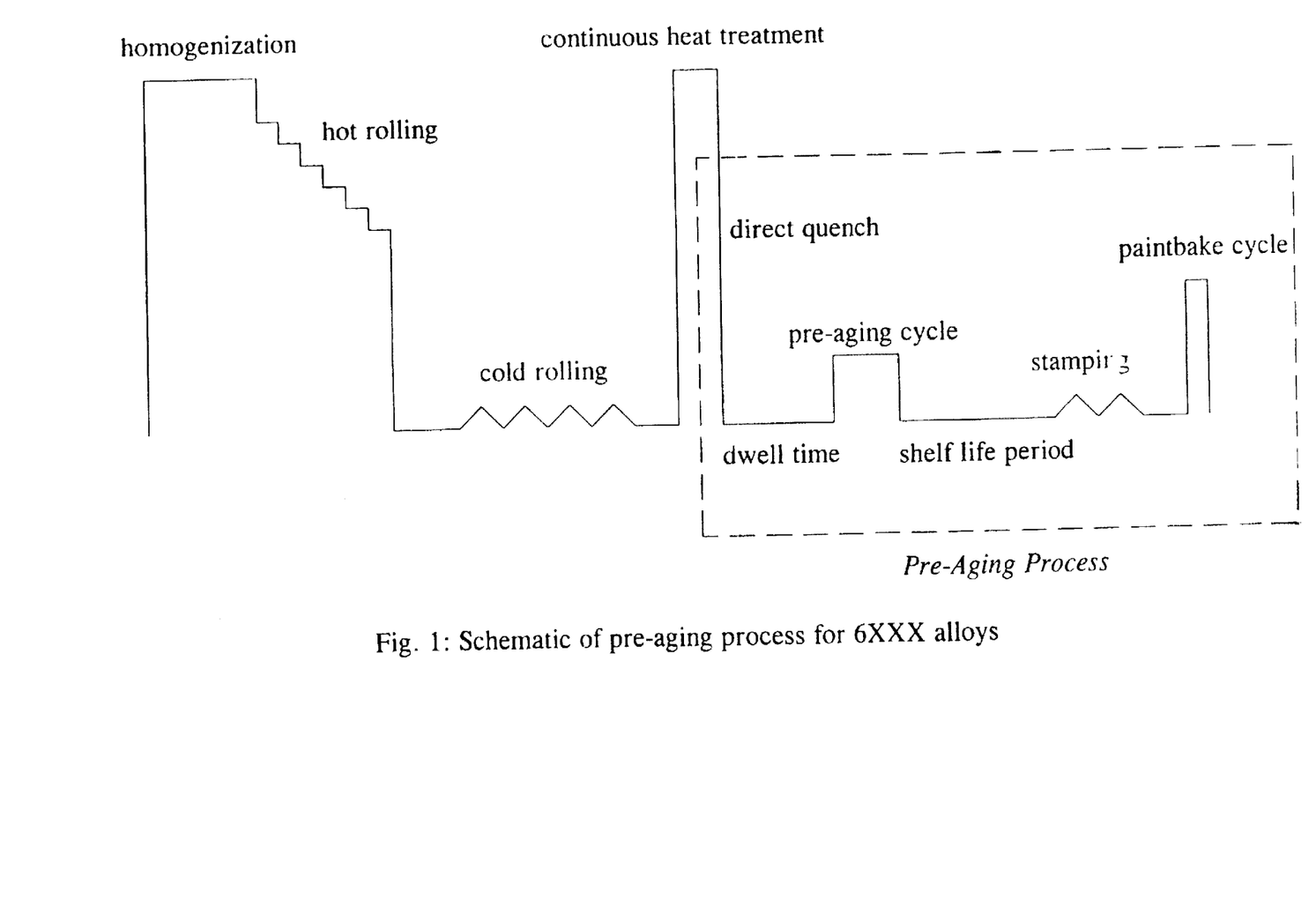
FIG. 1 is a schematic diagram of a prior art processing technique for pre-aging of aluminum alloy sheets.
Figure 2:
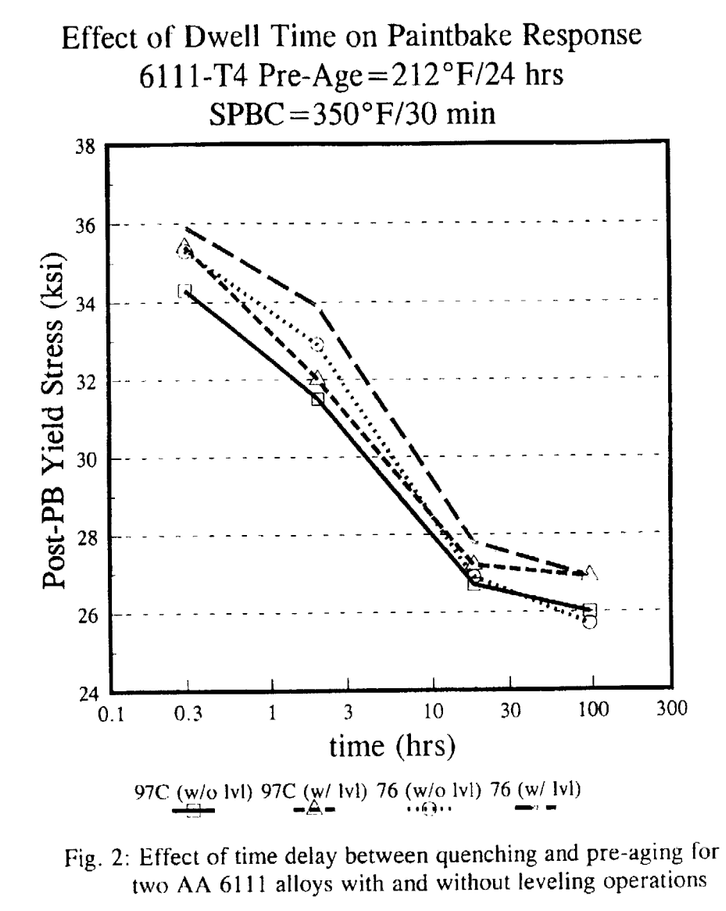
FIG. 2 is a graph showing the effect of dwell time on post paintbake yield stress.

While the pre-aging of aluminum alloys may offer improvements with respect to the manufacture of vehicle components, prior art pre-aging techniques are not without their disadvantages. In one prior art approach, aluminum alloy coils which have been solution heat treated and quenched are subjected to batch furnace heating. The use of batch (or coil) pre-aging approaches suffers from the phenomenon uncovered in our research and referred to as "dwell time decay". The dwell time is defined as the duration of time between the application of the quench and the application of the pre-age (FIG. 1). It was found that the potential PBR of the alloy was severely compromised as the dwell time increased. To determine the effect of ambient temperature dwell time on the effectiveness of a pre-aging treatment, a series of experiments were conducted. An AA 6111-F temper product was subjected to a standard solution heat treatment and quench. A pre-aging cycle of 212° F. for 24 hours was imposed following dwell times at 75° F. of 20 minutes, 120 minutes, 18 hours, and 96 hours. Subsequent to a 10 day natural aging (75° F.) period, the specimens were subjected to paintbake cycle of 350° F. for 30 minutes. The tensile test results showed that the effectiveness of the pre-aging treatment in enhancing the paintbake response was very sensitive to the dwell time. As shown in FIG. 2 in a semi-log plot, the post-paintbake yield strength was seen to decay rapidly from 36 ksi to 27 ksi as the dwell time was increased from 20 minutes to 96 hours, with most of the decay occurring in the first 18 hours. Increasing the dwell time from 20 minutes to two hours resulted in a 2 to 3 ksi loss in post-paintbake response (PBR). After 18 hours, the PBR had decayed to a level near that of the standard AA 6111 product.

Some of the obvious problems with batch treatment are:

1. The coiling time after heat treatment can be up to an hour, even without stoppages. Under most production conditions, autobody sheet is run at 75 to 200 fpm on a continuous heat treater (CHT). Coils could not be transferred, even under the best of conditions, until the head of the coil and the tail of the coil are wrapped onto the same arbor. At these speeds and the common coil sizes, the material near the arbor will have experienced a minimum of one hour of dwell time, compromising the performance of the product.

2. Heat transfer to the coil in a batch heat treating furnace would be sluggish. High furnace heads could not be tolerated as they would cause premature aging. The effective dwell time would increase significantly as the coil was brought to the pre-aging temperature. Again, performance would be compromised.

3. Heat transfer out of the coil (cooling) would be sluggish. Excessive pre-aging would also compromise performance.

4. A furnace load would require 6 to 8 coils per batch to be economical; the dwell time could be conceivably multiplied by this factor as the furnace load is accumulated.

Other technical difficulties are encountered if a continuous pre-aging approach is considered. Using a continuous pre-aging approach, sheet would be paid off the coil and pass through a low temperature heater and be cooled and coiled again. The obvious problem with applying this approach is the long soak times involved. Using the known successful pre-aging cycle of 212° F. soak for 24 hours would result in an unacceptable through-put from an economic standpoint. Alternative continuous pre-aging treatments also have their disadvantages. Applying a high temperature "spike" (soak times of several seconds to several minutes), see U.S. Pat. No. 4,808,247 to Komatsubura et al., as a pre-age using a continuous heat treater results in accelerated natural aging, a phenomenon which results in product instability and limited shelf life. This coiling-uncoiling-coiling approach also suffers from the economic barrier of having to pass the coil through yet one more processing line, incurring expense and possible handling damage and the associated losses.

In view of the disadvantages noted above in prior art processing utilizing both batch and continuous pre-aging treatments, a need has developed to provide an improved aluminum alloy sheet product which has improved paintbake response, resistance to natural aging, improved formability, and that can be produced with a viable economic process on an industrial scale. Responsive to this need, the present invention sets forth a method and an apparatus which produces an aluminum alloy sheet having an improved paintbake response and, quite surprisingly, also provides resistance to natural aging and improved formability.

SUMMARY OF THE INVENTION

A first object of the present invention is to provide a method of making aluminum sheet which will have a superior strength following the application of conventional automotive paintbake cycles.

Another objective of the present invention is to produce an aluminum sheet product which exhibits superior stability during extended periods of natural aging, so as to provide for consistent stamping performance during its use in the production of automotive and truck components, such as panels.

A further object of the present invention is to provide an apparatus for making aluminum sheet having superior strength following the application of conventional automotive paintbake cycles.

A still further object of the present invention is to provide a method and apparatus of making aluminum sheet which is adaptable for aluminum alloys typically used in vehicle component applications such as Al-Mg-Si alloys, Al-Mg-Si-Cu alloys and more preferably AA 2000 and AA 6000 series type aluminum alloys.

Other objects and advantages of the present invention will become apparent as a description thereof proceeds.

In satisfaction of the forgoing objects and advantages, in its broadest embodiment, the inventive method is an improvement over the known processing of making aluminum alloy sheet based on either Al-Mg-Si or Al-Mg-Si-Cu containing aluminum alloys wherein the alloy is hot rolled and cold rolled to form a cold rolled sheet. The cold rolled sheet is then further subjected to continuous solution heat treating, continuous quenching and continuous coiling to provide the sheet in coil form. According to the invention, the sheet is continuously and rapidly heated to a pre-aging temperature after the continuous quenching step and prior to the continuous coiling step. After rapid heating, the sheet in coil form is ambiently cooled, the rapid heating and ambient cooling improving the paintbake response of the aluminum alloy sheet.

Preferably, the rapid heating raises the coiled sheet temperature to between 150° and 250° F., more preferably about 200° F. The ambient cooling rate will be a function of ambient conditions but is preferred to be between 2° and 6° F. per hour and more preferably about 3° F. per hour.

The rapid heating step is designed to raise the temperature of the aluminum sheet after quenching to the target pre-aging temperature as fast as possible, preferably by induction heating.

In the apparatus of the invention, a means for continuously rapidly heating the sheet to a pre-aging temperature is disposed between a conventional solution heat treating/quenching apparatus and the coiling station of a conventional continuous aluminum alloy heat treating line. The means for rapid heating is preferably an induction heater so that the sheet temperature is rapidly brought up to the pre-aging temperature for subsequent ambient cooling and yet provides sufficient uniformity and control in the event of line slowdowns or stoppages.

In a further aspect of the invention a sheet product made by the method described above is disclosed, the sheet product exhibiting significant improvement in paintbake response, e.g. up to 14 ksi or more, as well as resistance to natural aging and improved formability as a result of increased elongation values, superior workhardening character and lower strength in the pre-paintbaked condition.

More preferably, solution heat treated and quenched aluminum sheet is rapidly heated to a temperature between about 150° F. and about 250° F. in a continuous process, such heating occurring as soon as possible after the application of the quench and leveling which follow solution heat treatment. The aluminum sheet is then coiled and allowed to cool as a coiled product without the necessity of additional furnace treatments. The natural cooling of the coil on the plant floor provides for an acceptable pre-aging treatment which avoids the need for subsequent re-heating and is subject to only minimal losses in performance due to the phenomenon of dwell time decay.

BRIEF DESCRIPTION OF THE DRAWINGS

Reference is now made to the drawings of the invention wherein.

DESCRIPTION OF THE PREFERRED EMBODIMENTS

The inventive method and apparatus are effective at significantly improving the strength of Al-Mg-Si and Al-Mg-Si-Cu-type aluminum alloy autobody sheet, while simultaneously improving its formability and stamping performance. Use of the inventive processing method on these types of aluminum alloy sheet products enhances the artificial aging response obtained during the standard automotive paintbake cycles by up to 4-fold.

In the present invention, the aluminum sheet is subjected to rapid heating to a pre-aging temperature following the standard solution heating and quenching and prior to sheet coiling. The pre-aging temperature is defined as that temperature which does not cause excessive aging and increased T4 yield strength while still providing a significant paintbake response, resistance to natural aging and improved formability. Preferably, the pre-aging temperature is between 150° and 250° F. The heating rate is such that the material being continuously and rapidly treated is brought up to the pre-aging temperature substantially instantaneously, i.e. without any ramping or other slow heat up. The heating occurs as soon as possible after the application of the quench which follows solution heat treatment. The aluminum is then coiled and allowed to cool as a coiled product without the necessity of additional furnace treatments. The natural cooling of the coil, usually on a plant floor, provides for an acceptable pre-aging treatment which avoids the need for subsequent re-heating and is subject to only minimal losses in performance due to the phenomenon of dwell time decay.

The method described provides distinct advantages over the standard practice and over batch pre-aging strategies discussed above. The most significant advantages are: Paintbake response can be increased from the standard 2 ksi to 14 ksi; Natural aging in the product is suspended; Formability of the product is increased. The application of the continuous pre-age cycle offers a method to produce an aluminum sheet product with improved dent resistance, greater stability for consistency of stamping and superior stamping performance. The processing method avoids additional metal handling, and thus promises to be a low cost method to improve product performance and reduce product variability.

Figure 3:
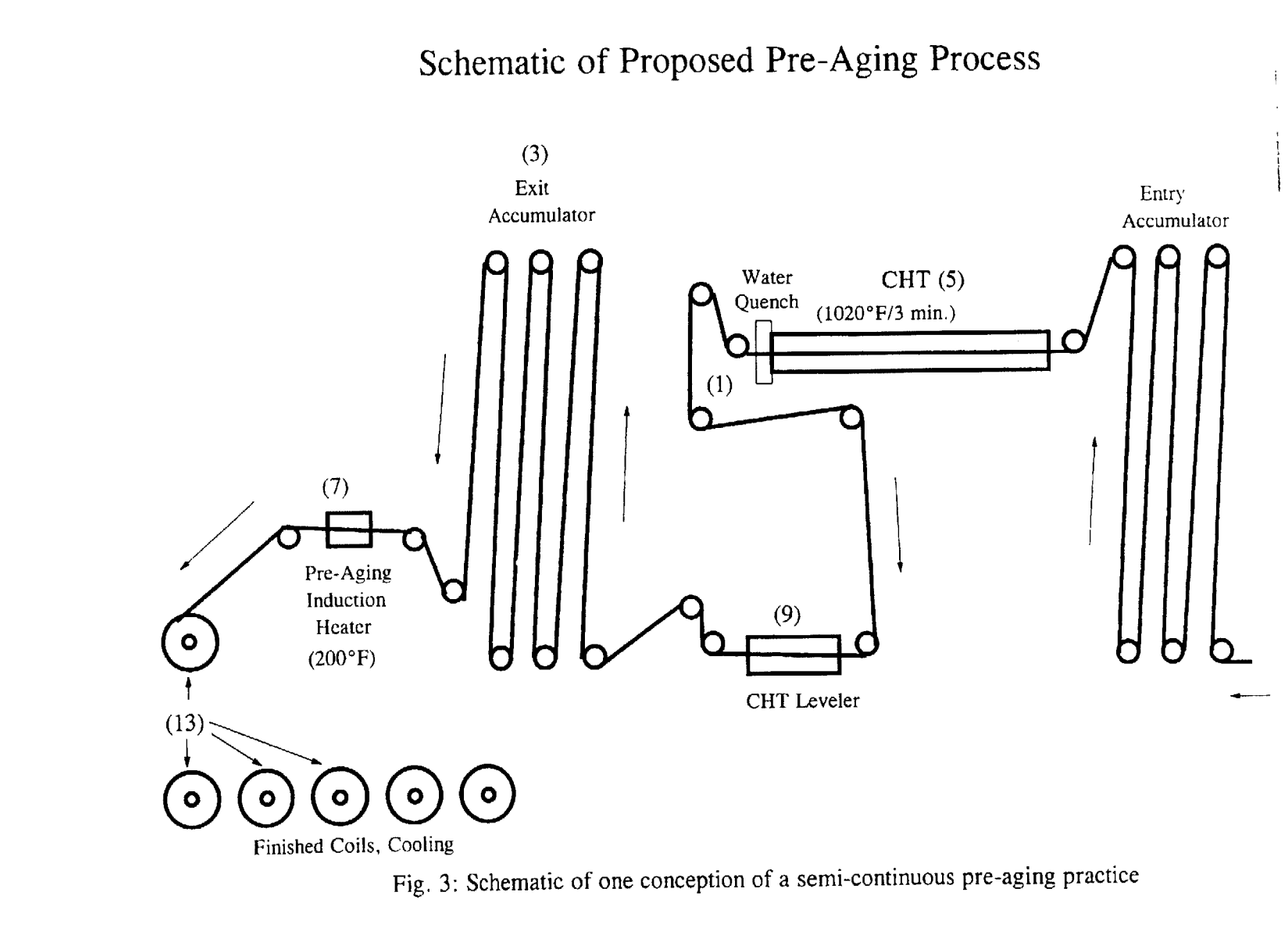
FIG. 3 is a schematic diagram of one mode of the inventive processing.

A schematic diagram showing one embodiment of a coil pre-aging apparatus is shown in FIG. 3. In this apparatus, a freshly quenched alloy 6111 sheet 1 exiting the accumulator 3 at the exit of a continuous heat treater (CHT) 5 is re-heated to a temperature of between 150° F. and 250° F. using an induction heater 7. FIG. 3 also shows a leveler 9 downstream of the CHT 5 and an exit accumulator 3 disposed between the leveler 9 and the induction heater 7.

After the sheet 1 is pre-aged by the induction heater 7, it is coiled into coil form 13 for subsequent processing.

It should be understood that the induction heater 7 is a preferred device for rapidly heating the solution heat treated and quenched sheet 1 prior to formation of the coil form 13. Any means for this rapid heating can be utilized according to the invention. The rapid heating means is designed to rapidly heat the sheet 1 to a target pre-age temperature.

The following provides an exemplary calculation to determine the power requirement or heating rate for a rapid heating means based on a target pre-aging temperature of 250° F., a specified line speed, a specified entry temperature and a specified size and type for the sheet to be rapidly heated. Of course, the power requirement may vary depending on the particular variables selected.

The theoretical power requirements for such a unit were calculated based on a line speed of 100 fpm, a 75° F. entry temperature, a 250° F. exit temperature, a sheet thickness of 0.041", a width of 72" and the physical properties of AA 6111 alloy. This calculation results in an estimated power requirement of 280 kW, a power requirement which is well within standard industrial capabilities.

To further demonstrate the improvements associated with the inventive apparatus and method, test work was performed with respect to paintbake response, natural aging resistance and improved formability. The tests described below further explain the ambient cooling rates used in conjunction with the rapid heating pre-aging treatment, as well as the enhanced physical properties achieved by the invention. It should be understood that the experiments described below are only exemplary of the invention and the invention is not so limited.

Using empirical data from plant trials and laboratory tests, experiments were conducted which investigated the natural cooling rate of metal coils on a plant floor to apply a low cost pre-aging treatment. In these experiments, the effect of changes in the time-temperature profile of the pre-aging treatment on paintbake response and T4 properties were studied.

These experiments also simulated reheating freshly quenched (6111-W[2 min.]) autobody sheet to a relatively low temperature (less than 250° F.) immediately before it was coiled at the exit end of the CHT. The thermal mass of the coil dictates that the cooling down to room temperature will be governed by classical Newtonian cooling. From empirical data as shown in FIG. 4, this cooling rate is surprisingly slow.

Figure 4:
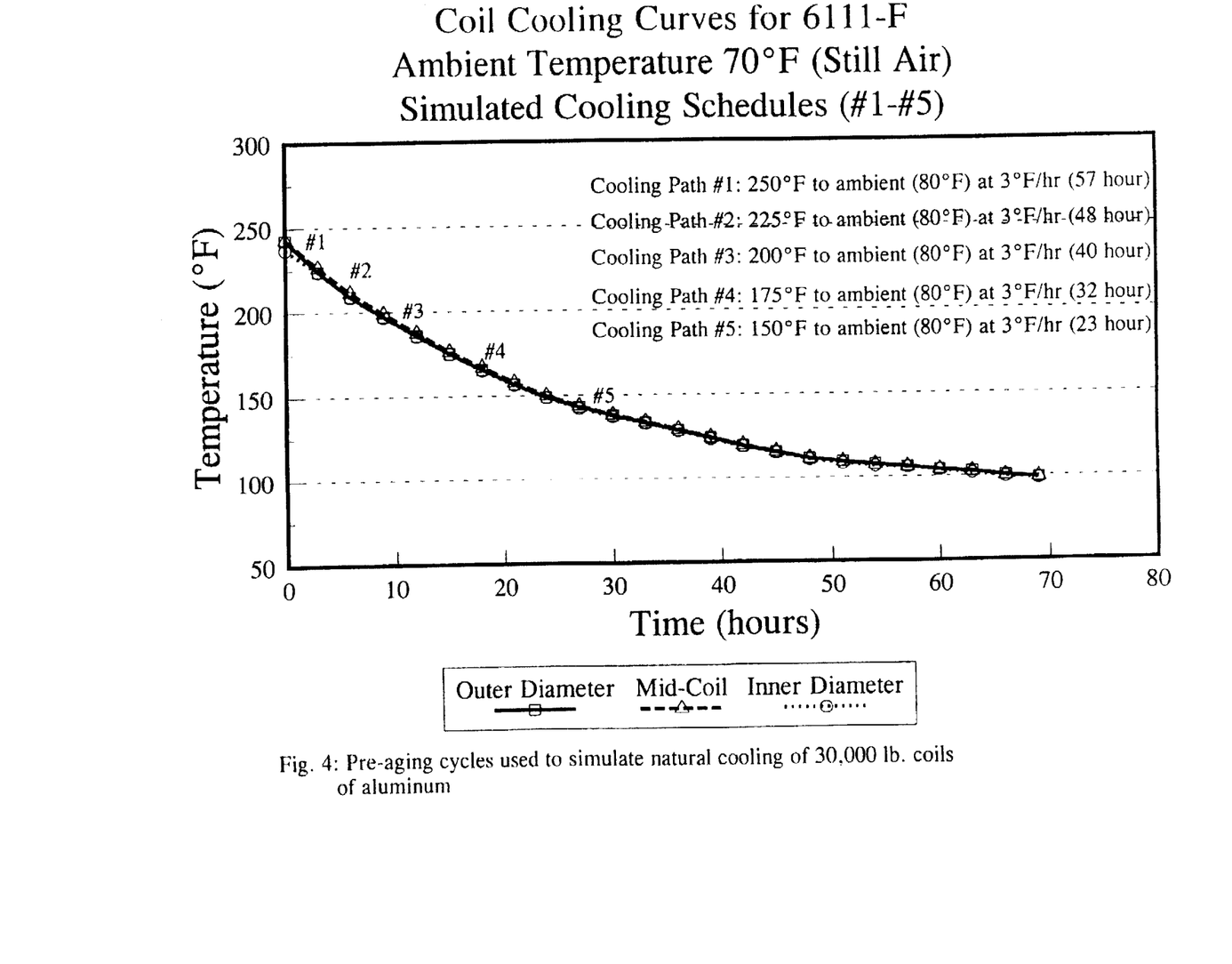
FIG. 4 is an ambient cooling curve for an aluminum coil.

In FIG. 4, a coil cooling curve for aluminum is shown. In this specific case, the data were taken from points within the wraps of a 72" wide coil of AA 6111-F (0.037" cold rolled). Several important points are worth noting:

1. Cooling rates near the outer wraps and near the center of the coil are nearly the same. This implies that cooling occurs largely through the sheet ends (axially) rather than through the surface of the outer wraps (radially), as would be expected given the relative heat transfer coefficients of aluminum and alumina/air/oil barriers.

2. Below 250° F., the cooling rate drops significantly. Though the cooling rate is logarithmic, it can be closely approximated as linear at 3° F./hour.

Based on the empirical data on coil cooling, laboratory furnaces were programmed to simulate the low temperature end of the cooling curve and impose this declining temperature profile on freshly quenched AA 6111-W. A dwell time of 2 minutes was selected, as this best approximates the time required for the metal to thread through the CHT leveler 9 and the accumulator 11 (See FIG. 3). Using a 3° F./hour cooling rate, five starting temperatures were tested: 250° F., 225° F., 200° F., 175° F., 150° F. Cooling times to ambient temperature were 57, 48, 40, 32 and 23 hours, respectively. A representation of these five cooling paths is also given in FIG. 4.

Following the rapid heating pre-aging treatment, samples were allowed an additional 10 days of natural aging (T4 treatment) and then specimens were taken for tensile examination and to prepare foil for transmission electron microscopy. Half of the specimens were given a standard paintbake simulation (350° F./30 min.) and half were tested in the as pre-aged+10 days natural aged condition.

Figure 5:
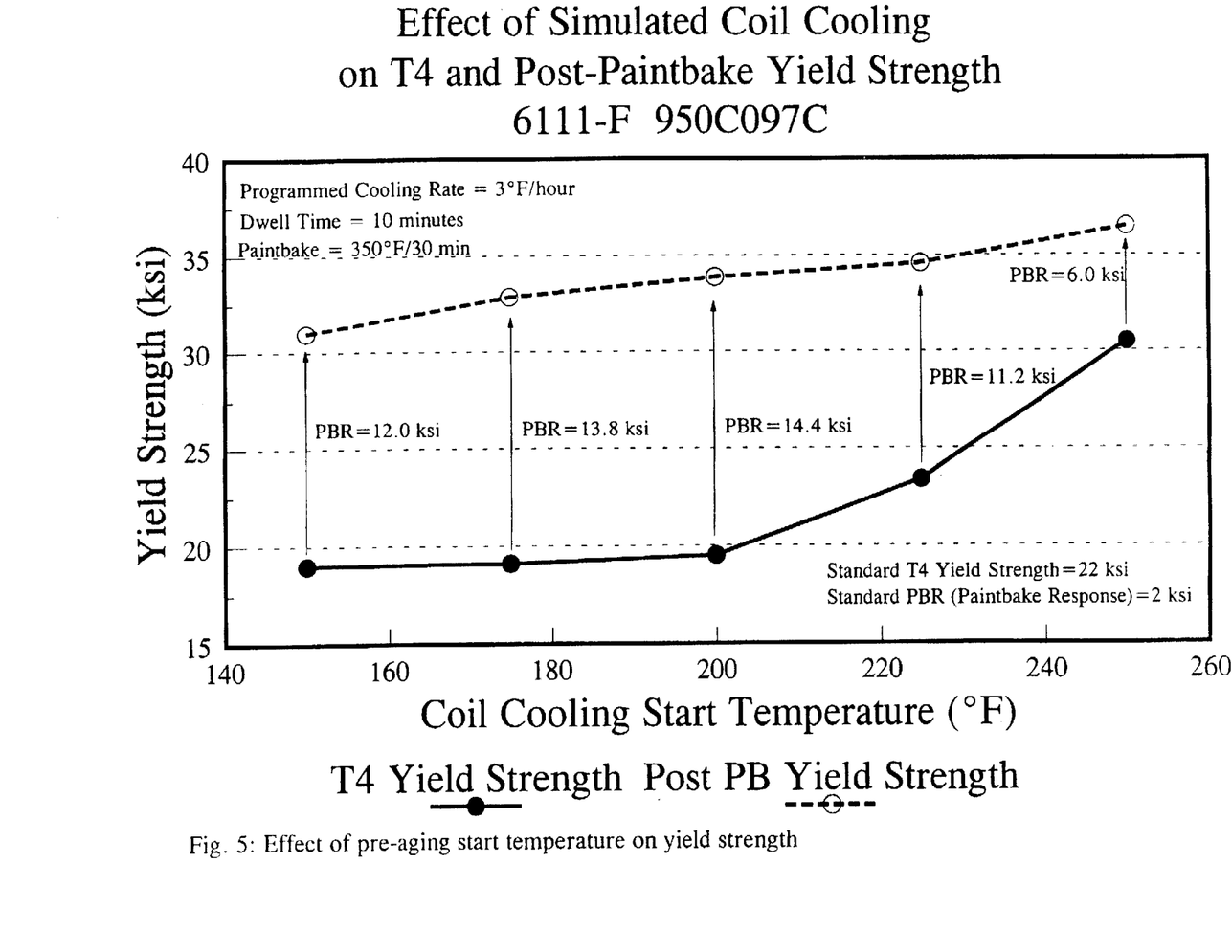
FIG. 5 is a graph showing the effect of rapid heating to temperatures between 175° F. and 250° F. followed by simulated coil cooling on yield strength both before and after a simulated paintbake treatment.

The tensile yield strength, both before and after simulated paintbake cycles, is shown in FIG. 5 for the five starting temperatures of the coil cooling simulation. From these data it can be concluded:

1. A starting temperature between 200° F. and 225° F. appears optimum. Temperatures above 225° F. while providing a good PBR appear to cause premature aging (increased T4 yield strength), and temperatures below this range begin to reduce the paintbake response.

2. For the specimens given a 200° F. starting temperature, a 14.4 ksi PBR was achieved. This should be contrasted with the 2 ksi PBR in standard AA 6111-T4 and a 9 ksi response seen in AA 6111 given a "square wave" pre-age cycle at 212° F. for 24 hours after a 2 hour dwell time.

Thus, by rapidly heating a solution heat treated and quenched aluminum alloy sheet prior to coiling, significant paintbake response is achieved, together with improved stamping performance due to the reduction in T4 yield strength.

Figure 6:
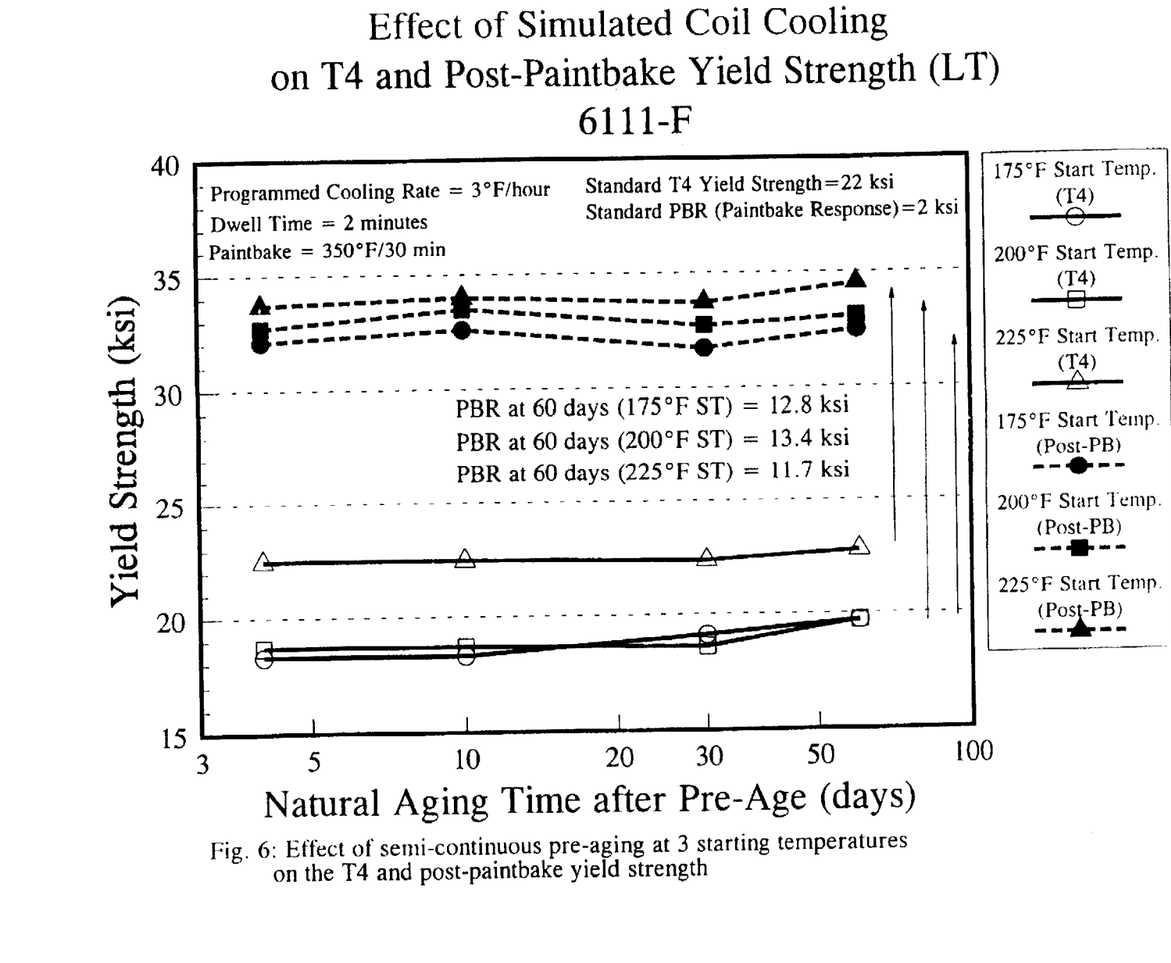
FIG. 6 is a graph showing the effect of rapid heating and simulated coil cooling on yield strength and paintbake response.
Figure 7:
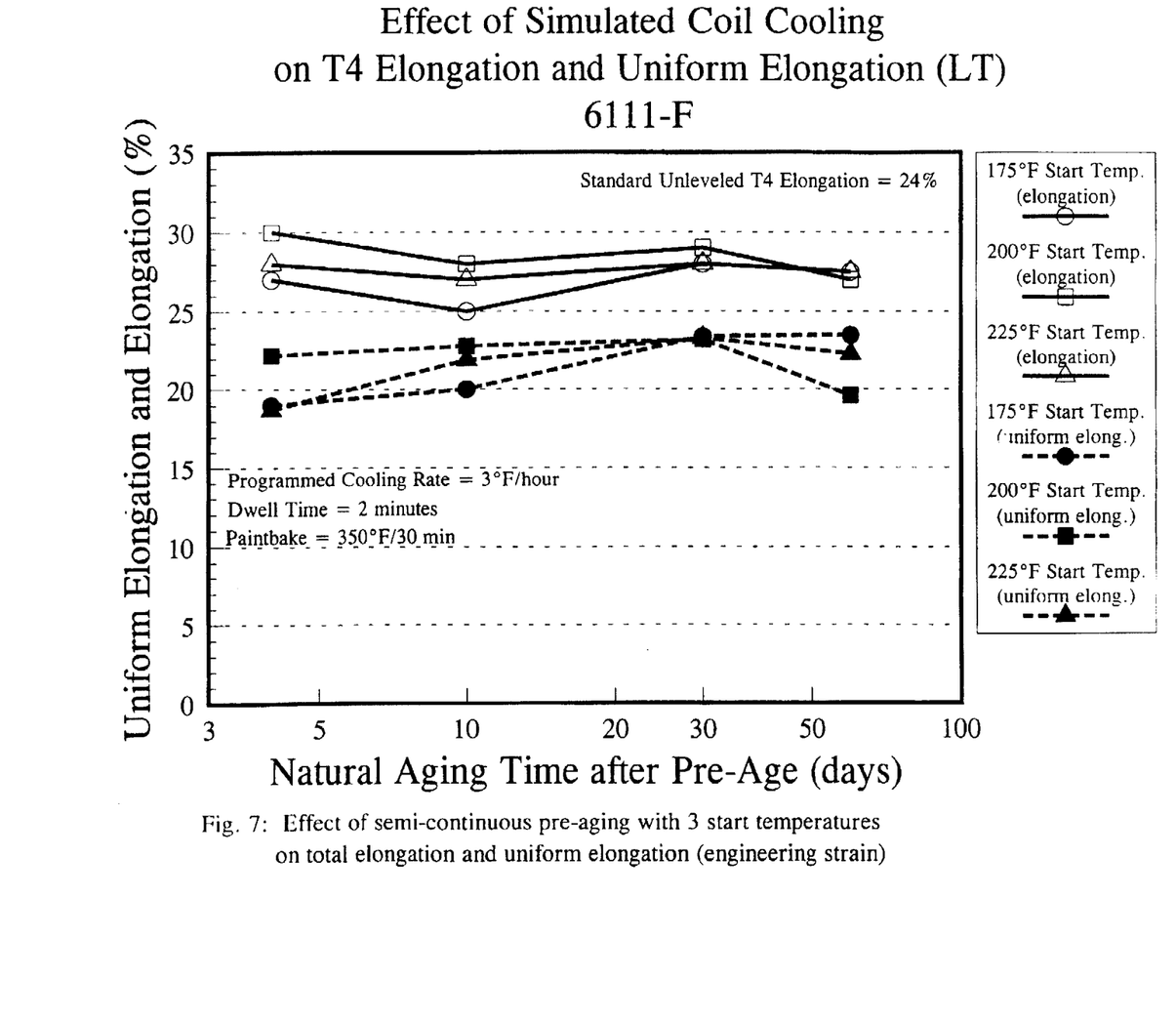
FIG. 7 is a graph showing the effect of rapid heating and simulated coil cooling on the total elongation and uniform elongation.

Referring now to FIGS. 6 and 7, the effect of natural aging time on AA 6111 aluminum alloys previously subjected to the inventive pre-aging practice is shown. Referring specifically to FIG. 6, the T4 aluminum alloy sheet prior to paint baking shows a relatively flat curve for yield strength over 60 days. What this means is that, by pre-aging according to the invention, resistance to natural aging is increased. Thus, the aluminum sheet does not exhibit the typical yield strength increase in T4 yield strength, i.e. one or two ksi, which can adversely affect stamping performance. The T4 yield strength is also lowered, reducing the problem of springback that is common with automotive aluminum stampings.

FIG. 6 also reaffirms the significant paintbake response achieved when the aluminum sheet is pre-aged according to the invention, even after 60 days of natural aging time.

Referring now to FIG. 7, quite surprisingly along with improved paintbake response, aluminum sheet subjected to the inventive processing also exhibits significant improvements in T4 total elongation and uniform elongation. The curves noted in FIG. 7 as measuring elongation show significant improvements over the standard unleveled T4 elongation of 24%. Using a 200° F. start temperature and 60 days of natural aging time, a 4% increase over the prior art standard is realized (28%).

Concerning uniform elongation, typically, this value for a standard AA 6111-T4 alloy is about 18%. When using the inventive processing, uniform elongation is vastly improved, extending up to 23% for a pre-aging temperature of 200° F.

In summary, the data discussed above indicate that superior stability and PBR are achieved when practicing the invention, particularly when using a 3° F. per hour ambient cooling rate from a 200° F. pre-aging temperature. Tensile tests performed on samples prior to the application of a paintbake cycle indicate that elongation to failure which closely parallels formability and stamping performance is increased up to 28%, a full 4% improvement over standard AA 6111-T4 aluminum alloy elongation. Similarly, uniform elongation is also improved when practicing the invention. In addition, a paintbake response far exceeding the normal 2 ksi is achieved when rapidly heating an aluminum sheet directly after continuous heat treatment and quenching and ambiently cooling the coil. In conjunction with these improvements, the aluminum sheet also shows resistance to natural aging by not showing an increase in yield strength over time. This aging resistance is significant since increases in yield strength over time can adversely effect stamping performance.

As such, an invention has been disclosed in terms of preferred embodiments thereof which fulfill each and every one of the objects of the present invention as set forth above and provides a new and improved method and apparatus for making aluminum alloy sheet product for vehicle component use.

Of course, various changes, modifications and alterations from the teachings of the present invention may be contemplated by those skilled in the art without departing from the intended spirit and scope thereof. Accordingly, it is intended that the present invention only be limited by the terms of the appended claims.

What is claimed is:

1. In method of making a Mg-Si containing aluminum alloy sheet product from an aluminum alloy having magnesium and silicon as alloying elements which comprises the steps of providing an Al-Mg-Si-containing aluminum alloy, subjecting said aluminum alloy to hot rolling and subsequent cold rolling to form a cold rolled sheet product, and further subjecting said cold rolled sheet product to continuous solution heat treating, quenching and coiling to provide said sheet product in coil form, the improvement comprising:

a) continuously rapidly heating said sheet product to a pre-aging temperature after said continuous quenching step and prior to said continuous coiling step; and b) ambient cooling said sheet in coil form from said pre-aging temperature to ambient temperature at a cooling rate of about 3° F. per hour, said heating and ambient cooling improving paintbake response of said aluminum alloy sheet product.

2. In a method of making a Mg-Si containing aluminum alloy sheet product from an aluminum alloy having magnesium and silicon as alloying elements which comprises the steps of providing an Al-Mg-Si-containing aluminum alloy, subjecting said aluminum alloy to hot rolling and subsequent cold rolling to form a cold rolled sheet product, solution heat treating the cold rolled sheet product, and quenching the solution heat treated sheet product, the improvement comprising:

a) rapidly heating said quenched sheet product to a pre-aging temperature as said sheet product is continuously moved through means for heating the sheet product;

b) coiling said rapidly heated quenched sheet product immediately after the heating thereof; and c) ambient cooling said sheet in coil form from said pre-aging temperature to ambient temperature at a cooling rate of between about 2° and 6° F. per hour, said heating and ambient cooling improving paintbake response of said aluminum alloy sheet product.

3. The method of claim 2 wherein said pre-aging temperature is between about 150° and 250° F.

4. The method of claim 3 wherein said pre-aging temperature is between about 175° and 225° F.

5. The method of claim 4 wherein said pre-aging temperature is about 200° F.

6. The method of claim 2 wherein said heating is by induction heating.

7. The method of claim 2 further comprising the step of leveling said sheet product after said quenching step and prior to said heating step.

8. The method of claim 2 wherein said coil form is uncoiled and subjected to stamping to form a vehicle component part.

9. The method of claim 8 wherein said vehicle component part is heated as part of a painting cycle.

10. The method of claim 2 wherein a time between an end of said continuous quenching and said heating is less than about 5 minutes.

11. The method of claim 2 wherein said pre-aging and ambient cooling steps improve stamping performance by increasing formability and further improve resistance to natural aging prior to forming of said sheet product.

12. The method of claim 2 wherein said Al-Mg-Si-containing aluminum alloy is an AA 6000 series aluminum alloy.

13. A method for processing a Mg-Si containing aluminum alloy sheet product that has been subjected to hot rolling and cold rolling to form a cold rolled sheet product, the method comprising the steps of:
  a) subjecting the cold rolled sheet product to continuous solution heat treating;
  b) continuously quenching said solution heat treated product;
  c) coiling said quenched sheet product; and
  d) continuously heating said quenched sheet product to a pre-aging temperature while said sheet product is being continuously moved from quenching to coiling thereof, the sheet product being cooled in coiled form from the pre-aging temperature to ambient temperature at a cooling rate of between about 2° and 6° F. per hour, the combination of heating the quenched sheet product to a pre-aging temperature and cooling the sheet product in coiled form providing a pre-aging treatment that improves properties of the sheet product.

14. The method of claim 13 wherein said pre-aging temperature is between about 150° and 250° F.

15. The method of claim 13 wherein said pre-aging temperature is between about 175° and 225° F.

16. The method of claim 13 wherein said pre-aging temperature is about 200° F.

17. The method of claim 13 wherein said heating is by induction heating.

18. The method of claim 13 further comprising the step of leveling said sheet product prior to said heating step.

19. The method claim 13 wherein said sheet product in coil form is uncoiled and subjected to stamping to form a vehicle component part.

20. The method of claim 19 wherein said vehicle component part is heated as part of a painting cycle.

21. The method of claim 13 wherein said coiled sheet product is cooled at a rate of about 3° F. per hour.

22. The method of claim 13 wherein a time between an end of said continuous quenching and said heating is less than about 5 minutes.

23. The method of claim 13 wherein said heating to a pre-aging temperature and cooling in coil form improve stamping performance by increasing formability and further improve resistance to natural aging prior to forming of said sheet product.

24. The method of claim 13 wherein said Al-Mg-Si-containing aluminum alloy is an AA 6000 series aluminum alloy.

* * * * *